(12) United States Patent
Puiu et al.

(10) Patent No.: US 10,962,064 B2
(45) Date of Patent: Mar. 30, 2021

(54) BIDIRECTIONAL OVERRUNNING CLUTCH FOR A MOTOR VEHICLE

(71) Applicant: GM Global Technology Operations LLC, Detroit, MI (US)

(72) Inventors: Dumitru Puiu, Sterling Heights, MI (US); Binu Jose Kochucheruvil, Rochester Hills, MI (US); Jun Ma, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 42 days.

(21) Appl. No.: 16/409,363

(22) Filed: May 10, 2019

(65) Prior Publication Data

US 2020/0355224 A1 Nov. 12, 2020

(51) Int. Cl.
| | |
|---|---|
| *F16D 11/12* | (2006.01) |
| *F16D 19/00* | (2006.01) |
| *B60W 20/40* | (2016.01) |
| *F16D 41/16* | (2006.01) |
| *F16D 15/00* | (2006.01) |
| *B60K 6/383* | (2007.10) |
| *F16D 41/08* | (2006.01) |

(52) U.S. Cl.
CPC ............. *F16D 11/12* (2013.01); *B60W 20/40* (2013.01); *F16D 15/00* (2013.01); *F16D 19/00* (2013.01); *F16D 41/16* (2013.01); *B60K 6/383* (2013.01); *F16D 41/084* (2013.01)

(58) Field of Classification Search
CPC ........... F16D 2127/004; F16D 2127/06; F16D 11/12; F16D 19/00; F16D 41/16; F16D 15/00; B60T 1/005; B60W 20/40; B60K 6/383; B60K 6/387; B60K 6/36; B60K 6/365; B60K 6/54; F16H 63/34; F16H 63/3475
See application file for complete search history.

(56) References Cited

U.S. PATENT DOCUMENTS

| | | | | |
|---|---|---|---|---|
| 2,974,752 | A * | 3/1961 | Howard | F16H 63/3475 188/69 |
| 2015/0283992 | A1* | 10/2015 | Kawai | B60K 6/383 475/2 |
| 2016/0339908 | A1* | 11/2016 | Komada | B60W 10/02 |
| 2018/0119815 | A1* | 5/2018 | Al-Regib | B60W 30/18136 |

\* cited by examiner

*Primary Examiner* — Mark A Manley
(74) *Attorney, Agent, or Firm* — Vivacqua Crane (57) ABSTRACT

The present disclosure provides a bidirectional controllable overrunning clutch for a powertrain of a motor vehicle, with the powertrain including a gear having ratchet teeth. The clutch includes a pawl movable to a disengaged position, a locked position, and a transition state where the pawl permits the gear to rotate in the forward direction and where rotation of the gear in the reverse direction moves the pawl to the locked position. The clutch further includes a spring for moving the pawl to the disengaged position. The clutch further includes an actuator configured to hold the pawl in the transition state when the gear rotates in the forward direction and the locked position when the gear changes rotation from the forward direction to the reverse direction.

20 Claims, 10 Drawing Sheets

BIDIRECTIONAL OVERRUNNING CLUTCH FOR A MOTOR VEHICLE

INTRODUCTION

The present disclosure relates to a bidirectional controllable overrunning clutch having a single pawl and a single actuator, and more particularly to a bidirectional overrunning clutch having a single pawl and single actuator for a powertrain used in a motor vehicle.

Hybrid electric vehicles (HEVs) include many features that benefit from having bidirectional clutches that hold the engine in a locked or grounded mode after an engine stop during electric vehicle operation (EV operation). Examples of these features include two electric motors being used efficiently in traction and regenerative modes independently of one another, when the engine node is locked or grounded. In these examples, the clutches include two or more sets of pawls and two or more actuators for engaging the pawls to corresponding gear teeth to control the clutch in forward and reverse directions. The number and complexity of these features may increase the weight and cost of the HEV powertrain. In addition, these clutches may require precise control to minimize impact load on the clutches where the pawls engage the teeth while the gear is rotating with significant inertia. On the other hand, HEV powertrain without clutches may demand significant power from the electric motors to prevent rotation of the engine during operation in the EV mode.

Thus, while current directional overrunning clutches achieve their intended purpose, there is a need for a new and improved bidirectional overrunning clutch that addresses these issues by, for example, following the natural progression of an engine start/stop sequence of events.

SUMMARY

According to several aspects, a bidirectional overrunning clutch for a powertrain of a motor vehicle is provided, with the powertrain having a gear defining ratchet teeth. The clutch includes a housing and a single pawl movable relative to the housing to a disengaged position where the pawl permits the gear to rotate in any of a forward direction and a reverse direction, a locked position where the pawl engages the ratchet teeth to prevent rotation of the gear in the forward direction and the reverse direction, and a transition state where the pawl permits the gear to rotate in the forward direction and where rotation of the gear in the reverse direction moves the pawl to the locked position. The clutch further includes a spring for moving the pawl to the disengaged position. In addition, the clutch also includes a single actuator configured to hold the pawl in the transition state when the gear rotates in the forward direction and the locked position when the gear changes rotation from the forward direction to the reverse direction.

In one aspect, the actuator includes a carrier configured to translate along a longitudinal axis relative to the housing. The carrier is movable between a retracted position and an extended position. The actuator further includes a shuttle element configured to translate relative to the carrier, with the shuttle element being movable between a first position and a second position. At least one of the carrier and the shuttle element is configured to move the pawl from the disengaged position to the transition state when the carrier is moved to the extended position. The shuttle element is configured to move to the second position where the shuttle element holds the pawl in the locked position when the carrier is disposed in the extended position and the gear changes rotation from the forward direction to the reverse direction.

In another aspect, the actuator further comprises a solenoid configured to move the carrier to the extended position.

In another aspect, the actuator further includes a first biasing member configured to move the carrier to the retracted position.

In another aspect, the actuator further includes a second biasing member configured to urge the shuttle element from the first position to the second position.

In another aspect, the pawl in the transition state blocks the shuttle element from moving toward the second position, and the second biasing member moves the shuttle element to the second position when the pawl is moved to the locked position.

In another aspect, the carrier defines a stop surface, with the shuttle element being spaced from the stop surface when the pawl is disposed in the transition state, and the shuttle element abutting the stop surface when the pawl is disposed in the locked state.

In another aspect, the shuttle element defines a ramp surface engaging the pawl to dispose the pawl in the transition state when the carrier is moved to the extended position.

In another aspect, the shuttle element is configured to oscillate along the longitudinal axis of the carrier while the gear rotates in the forward direction and the carrier is disposed in the extended position.

In another aspect, the ramp surface is angularly disposed relative to the longitudinal axis of the carrier.

In another aspect, the carrier defines a ramp surface engaging the pawl to dispose the pawl in the transition state when the carrier is moved to the extended position.

In another aspect, the pawl defines a stop surface and a recess formed in the stop surface, and the recess is configured to receive the shuttle element when the pawl is moved to the locked position to hold the pawl in the locked position.

In another aspect, movement of the carrier between the retracted position and the extended position is coextensive with movement of the shuttle element between a first position where the pawl is disposed in the transition state and a second position where the shuttle element holds the pawl in the locked position.

According to several aspects, a powertrain for a motor vehicle is provided, and the powertrain includes a geartrain including a gear configured to rotate about a rotational axis in any one of a forward direction and a reverse direction, with the gear defining ratchet teeth. The powertrain further includes a bidirectional overrunning clutch that includes a housing and a single pawl movable relative to the housing to a disengaged position where the pawl is spaced from the ratchet teeth to permit the gear to rotate in any of a forward direction and a reverse direction. The pawl is further movable to a locked position where the pawl engages the ratchet teeth to prevent rotation of the gear in the forward direction and the reverse direction. The pawl is further movable to a transition state where the pawl permits the gear to rotate in the forward direction and where rotation of the gear in the reverse direction moves the pawl to the locked position. The actuator further comprises a spring for moving the pawl to the disengaged position. In addition, the actuator further comprises a single actuator configured to move the pawl to the transition state to permit the gear to rotate in the forward direction, and the actuator is configured to hold the pawl in the locked position when the gear changes rotation from the forward direction to the reverse direction. The actuator further includes a single carrier configured to translate along a longitudinal axis relative to the housing, with the carrier being movable between a retracted position and an extended position. The actuator further includes a single shuttle element configured to translate relative to the carrier. At least one of the carrier and the shuttle element is configured to move the pawl from the disengaged position to the transition state when the carrier is moved to the extended position. The shuttle element is movable from a first position to a second position where the shuttle element holds the pawl in the locked position when the carrier is disposed in the extended position and the gear changes rotation from the forward direction to the reverse direction.

In one aspect, the actuator further comprises a solenoid configured to move the carrier to the extended position.

In another aspect, the carrier is configured to translate along the longitudinal axis wherein the longitudinal axis is disposed parallel to the rotational axis of the gear.

In another aspect, the carrier is configured to translate along the longitudinal axis wherein the longitudinal axis is disposed perpendicular to the rotational axis of the gear.

In another aspect, the pawl includes a lever pivotally coupled to the housing. The pawl further includes an arm configured to transmit a load from the gear to the lever when the gear rotates in the forward direction, and the arm is movable between a rest position and a collapsed position. The pawl further includes a spring that urges the arm to the rest position. The arm disposed in the collapsed position extends along a radial line intersecting a center of the gear such that the arm receives only a tangential component of the load.

According to several aspects, a powertrain for a motor vehicle is provided, and the powertrain includes an internal combustion engine, a first electric motor, a second electric motor, and an output. The powertrain further includes a geartrain configured to transmit torque between the internal combustion engine, the first electric motor, the second electric motor, and the output. The powertrain includes a plurality of gears, such as a flywheel configured to rotate about a rotational axis in any one of a forward direction and a reverse direction, with the flywheel defining ratchet teeth. The powertrain further includes a bidirectional overrunning clutch that includes a housing and a single pawl movable relative to the housing to a disengaged position where the pawl is spaced from the ratchet teeth to permit the gear to rotate in any of a forward direction and a reverse direction. The pawl is further movable to a locked position where the pawl engages the ratchet teeth to prevent rotation of the gear in the forward direction and the reverse direction. The pawl is further movable to a transition state where the pawl permits the gear to rotate in the forward direction and where rotation of the gear in the reverse direction moves the pawl to the locked position. The actuator further comprises a spring for moving the pawl to the disengaged position. In addition, the actuator further comprises a single actuator configured to hold the pawl in the transition state when the gear rotates in the forward direction and the locked position when the gear changes rotation from the forward direction to the reverse direction. The actuator further includes a housing and a single carrier configured to translate along a longitudinal axis relative to the housing, with the carrier being movable between a retracted position and an extended position. The actuator further includes a single shuttle element configured to translate relative to the carrier. At least one of the carrier and the shuttle element is configured to move the pawl from the disengaged position to the transition state when the carrier is moved to the extended position. The shuttle element is movable from a first position to a second position where the shuttle element holds the pawl in the locked position when the carrier is disposed in the extended position and the gear changes rotation from the forward direction to the reverse direction.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

Figure 1:
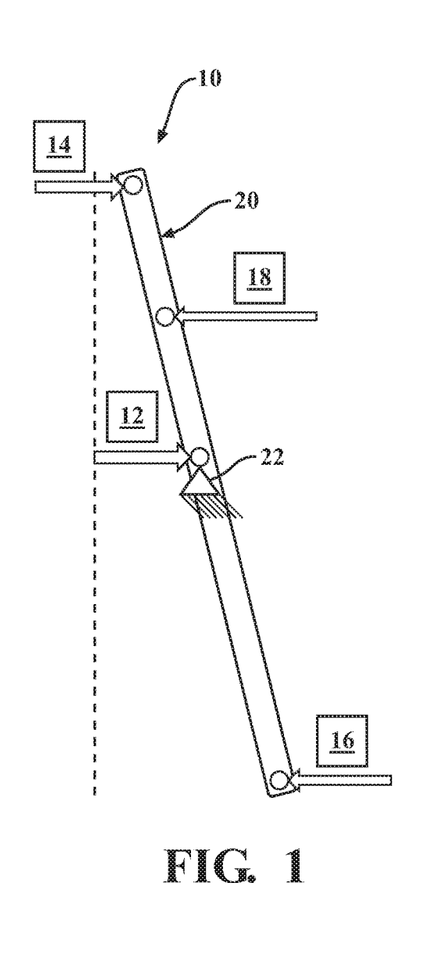
FIG. 1 is a schematic lever diagram of a powertrain for a hybrid electric vehicle having a bidirectional overrunning clutch, illustrating the vehicle disposed in HEV mode operation with an engine running and the clutch being disengaged to permit rotation of a flywheel coupled to the engine in a forward direction.
Figure 2:
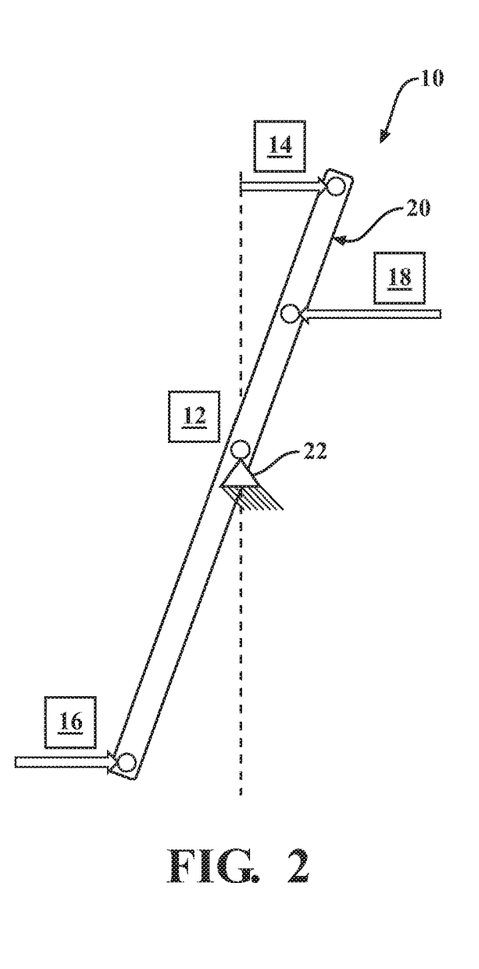
FIG. 2 is a schematic lever diagram of the powertrain of FIG. 1, illustrating the vehicle disposed in EV mode operation with the engine off and the clutch being disposed in a transition state to permit the flywheel to continue rotating in the forward direction while preventing the flywheel from rotating in a reverse direction.
Figure 3:
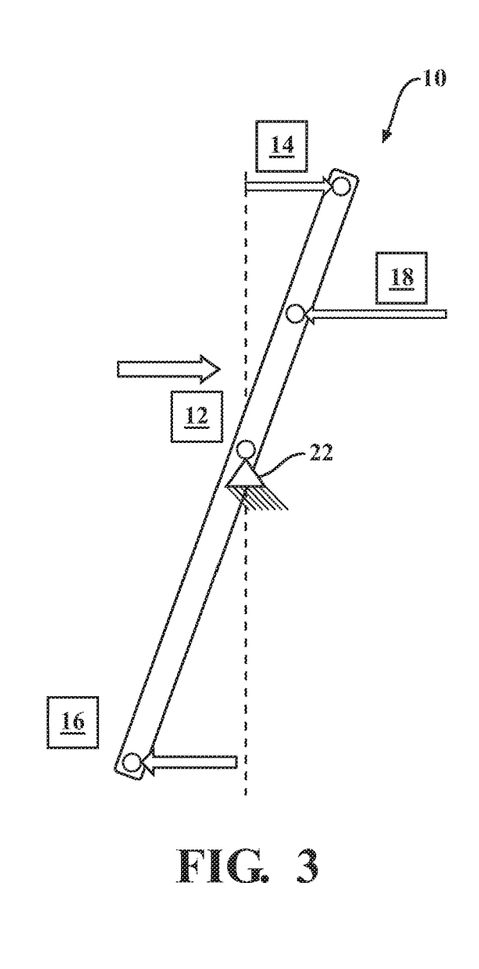
FIG. 3 is a schematic lever diagram of the powertrain of FIG. 2, illustrating the vehicle disposed in EV mode operation with the engine off and the clutch engaged to prevent rotation of the engine in the forward or reverse directions.

Referring to FIGS. 1-3, a powertrain of a hybrid electric vehicle (HEV) is shown in the form as schematic lever diagrams and generally indicated by reference number 10. The powertrain 10 includes an internal combustion engine 12, a first electric motor 14, a second electric motor 16, an output 18, a geartrain 20 in a power split configuration, and a bidirectional overrunning clutch 22 configured to transmit torque from the engine 12, the first electric motor 14, and the second electric motor 16 to the output 18.

FIGS. 1-3 illustrate the natural progression of the HEV as the powertrain 10 transitions from operating in an HEV mode to an EV mode, with the clutch 22 being configured to prevent the engine from rotating such that both electric motors 14, 16 can transmit torque to the output 18. As shown in FIG. 1, the engine 12 and the electric motors 14, 16 may transmit torque through the geartrain 20 to the output 18 while the HEV operates in the HEV mode when, for example, the HEV is accelerating above a predetermined threshold requiring power from the engine 12 and both electric motors 14, 16. As shown in FIG. 2, the engine can be turned off and the second electric motor 16 may apply torque to the engine 12 to slow rotation of the engine in the forward direction when, for example, the driver begins slowing the vehicle to a stop. As shown in FIG. 3, the clutch 22 may lock the engine 12 and prevent same from rotating, such that the first and second electric motors 14, 16 may transmit torque through the geartrain 20 to the output 18 during the EV mode. As described in detail below, initial rotation of the engine 12 in the reverse direction by a few degrees may trigger the clutch to lock the engine 12 and prevent same from rotating in either the forward direction or reverse direction.

Figure 4:
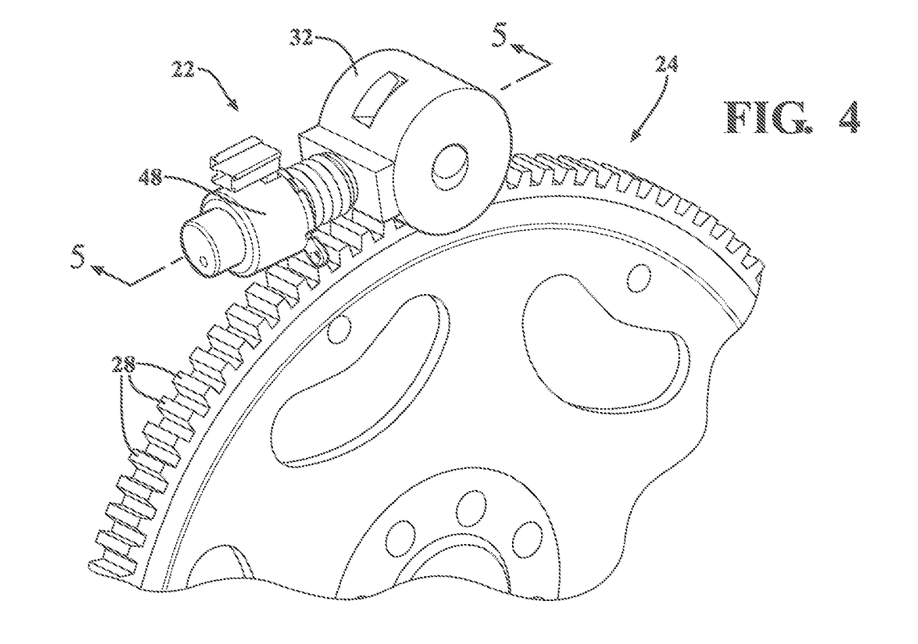
FIG. 4 is a fragmentary perspective view of the powertrain of FIGS. 1-3, illustrating the powertrain including the flywheel and the clutch operably coupled to the flywheel.

Referring to FIG. 4, the powertrain 10 includes a plurality of gears, such as a flywheel 24 configured to rotate about a rotational axis 26 in any one of a forward direction and a reverse direction. The flywheel 24 defines a plurality of ratchet teeth 28. Each tooth has an asymmetrical profile, including one edge having a slope that is steeper than the slope of the other edge. The powertrain 10 may include torsional vibration dampers (not shown) and a breakaway clutch (not shown) operably coupled to the flywheel 24.

Figure 5:
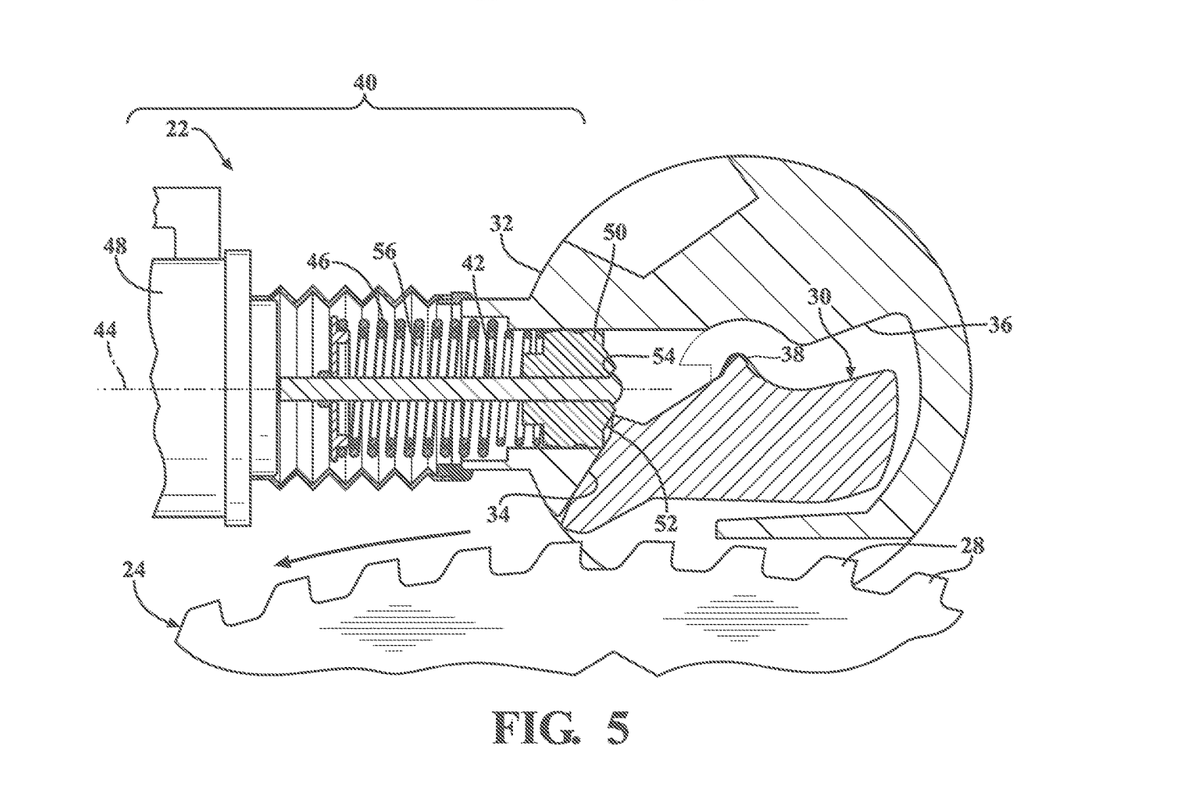
FIG. 5 is a cross-sectional view of the clutch and the portion of the powertrain taken from lines 5-5 of FIG. 4, illustrating the clutch disposed in an inline configuration relative to the flywheel and the pawl being disposed in a disengaged position.
Figure 6:
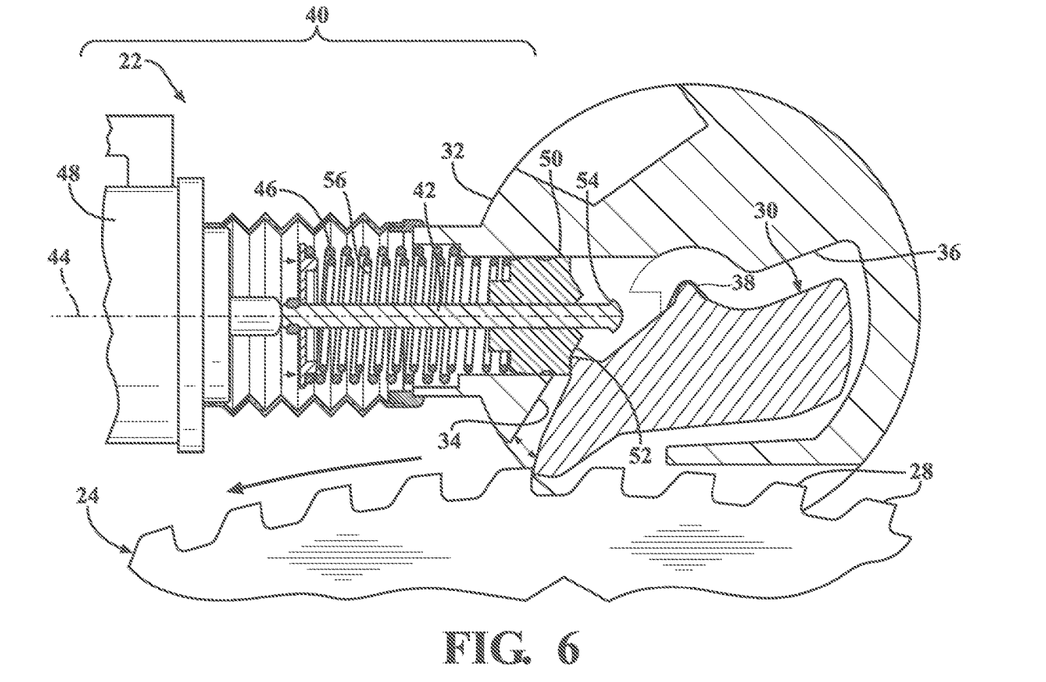
FIG. 6 is a cross-sectional view of the clutch and the portion of the powertrain taken from lines 5-5 of FIG. 4, illustrating the pawl disposed in the transition state.
Figure 7:
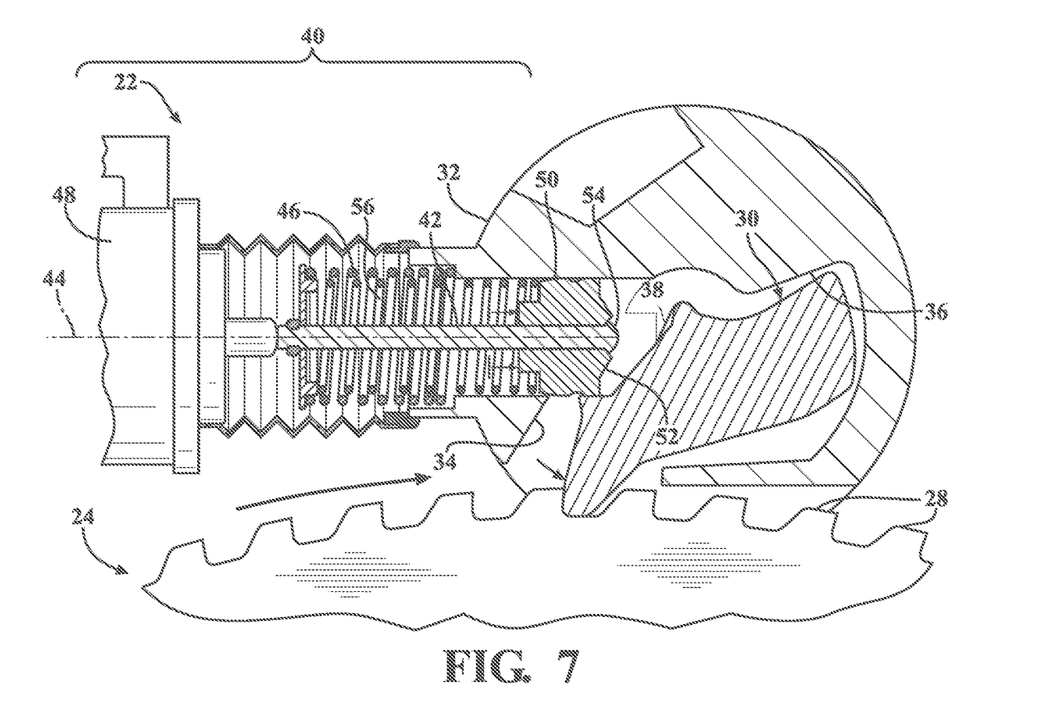
FIG. 7 is a cross-sectional view of the clutch and the portion of the powertrain taken from lines 5-5 of FIG. 4, illustrating the pawl disposed in a locked position.
Figures 8A, 8B:
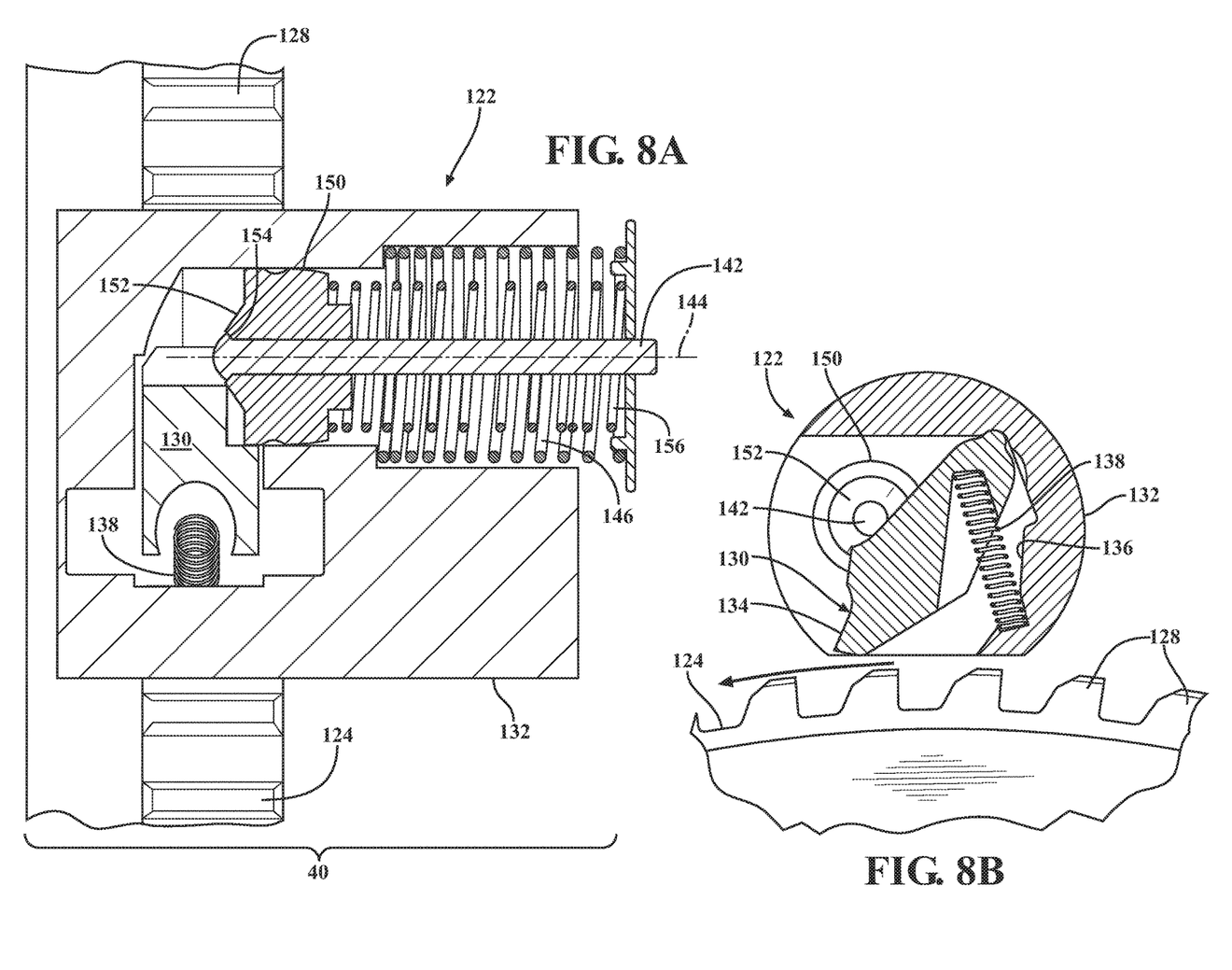
FIG. 8A is a lateral cross-sectional view of another embodiment of a clutch and a portion of a powertrain, illustrating the clutch disposed in a perpendicular configuration relative to the flywheel and the pawl being disposed in a disengaged position.
FIG. 8B is a longitudinal cross-sectional view of the clutch and the portion of the powertrain of FIG. 8A.
Figures 9A, 9B:
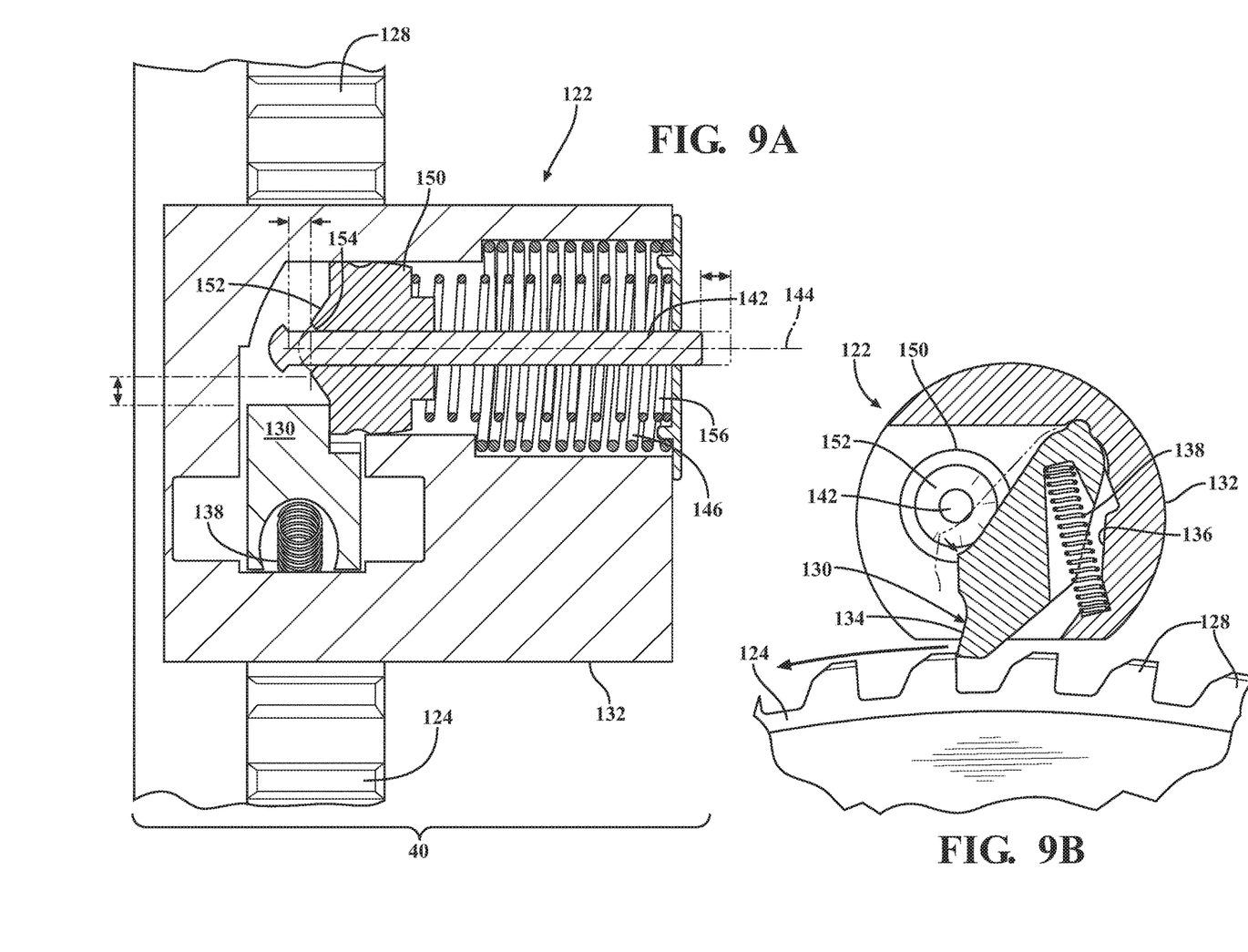
FIG. 9A is a lateral cross-sectional view of the clutch and the portion of the powertrain of FIG. 8A, illustrating the pawl disposed in the transition state.
FIG. 9B is a longitudinal cross-sectional view of the clutch and the portion of the powertrain of FIG. 9A.
Figures 10A, 10B:
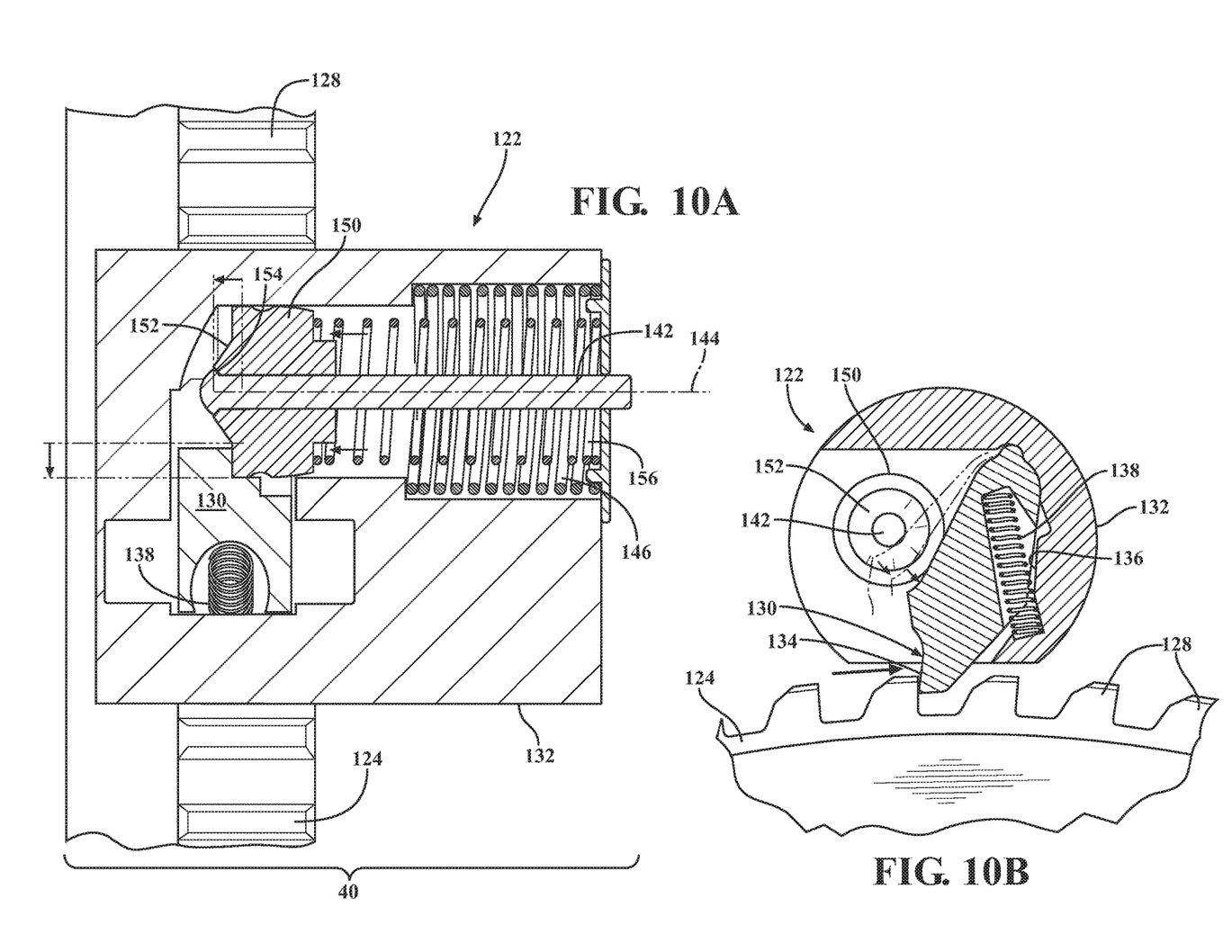
FIG. 10A is a lateral cross-sectional view of the clutch and the portion of the powertrain of FIG. 8A, illustrating the pawl being disposed in a locked position.
FIG. 10B is a longitudinal cross-sectional view of the clutch and the portion of the powertrain of FIG. 10A.
Figures 11A, 11B:
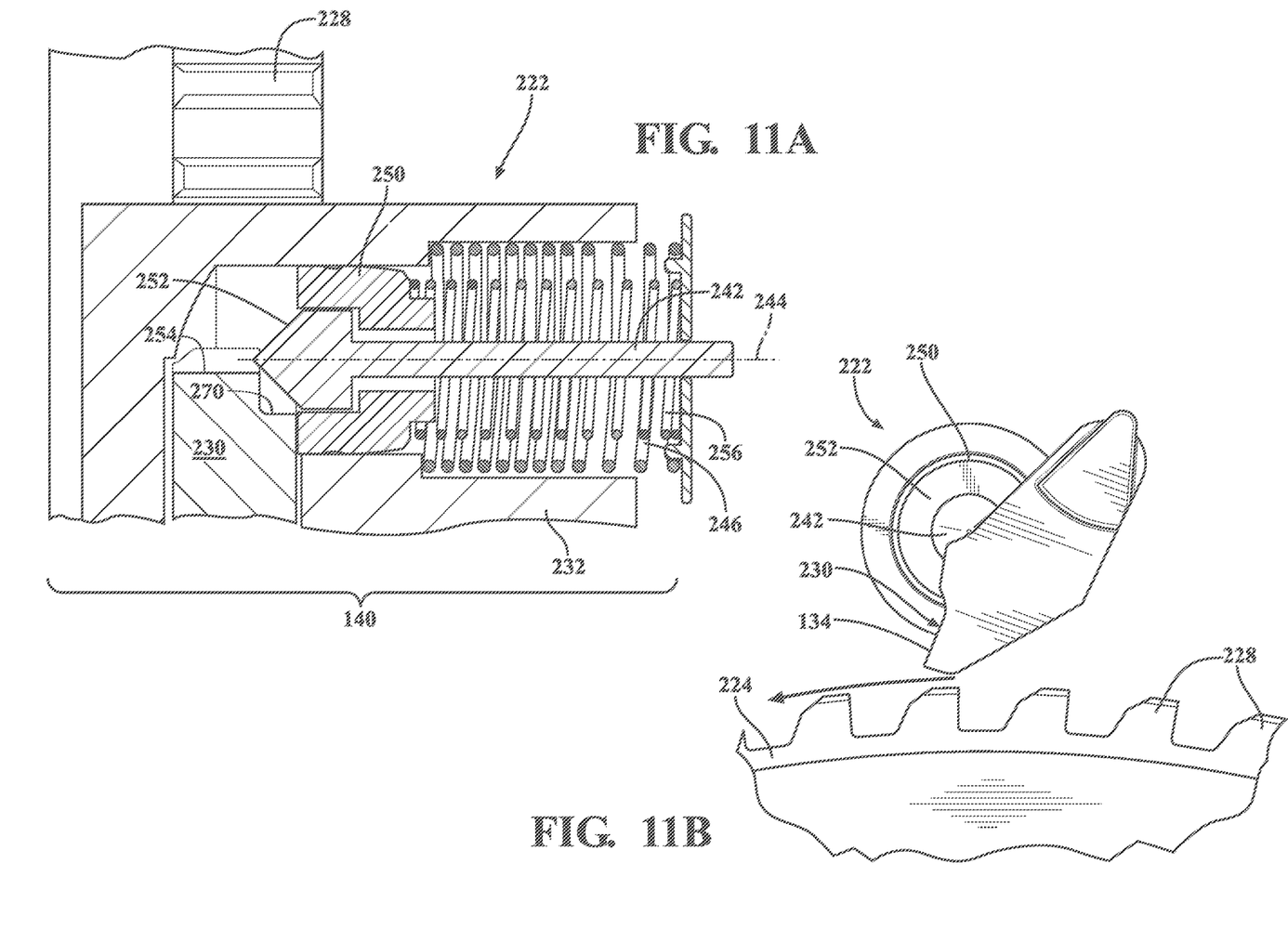
FIG. 11A is a lateral cross-sectional view of still another embodiment of the clutch and the portion of the powertrain, illustrating the clutch disposed in a perpendicular configuration relative to the flywheel and the pawl being disposed in a disengaged position.
FIG. 11B is a longitudinal cross-sectional view of the clutch and the portion of the powertrain of FIG. 11A.
Figures 12A, 12B:
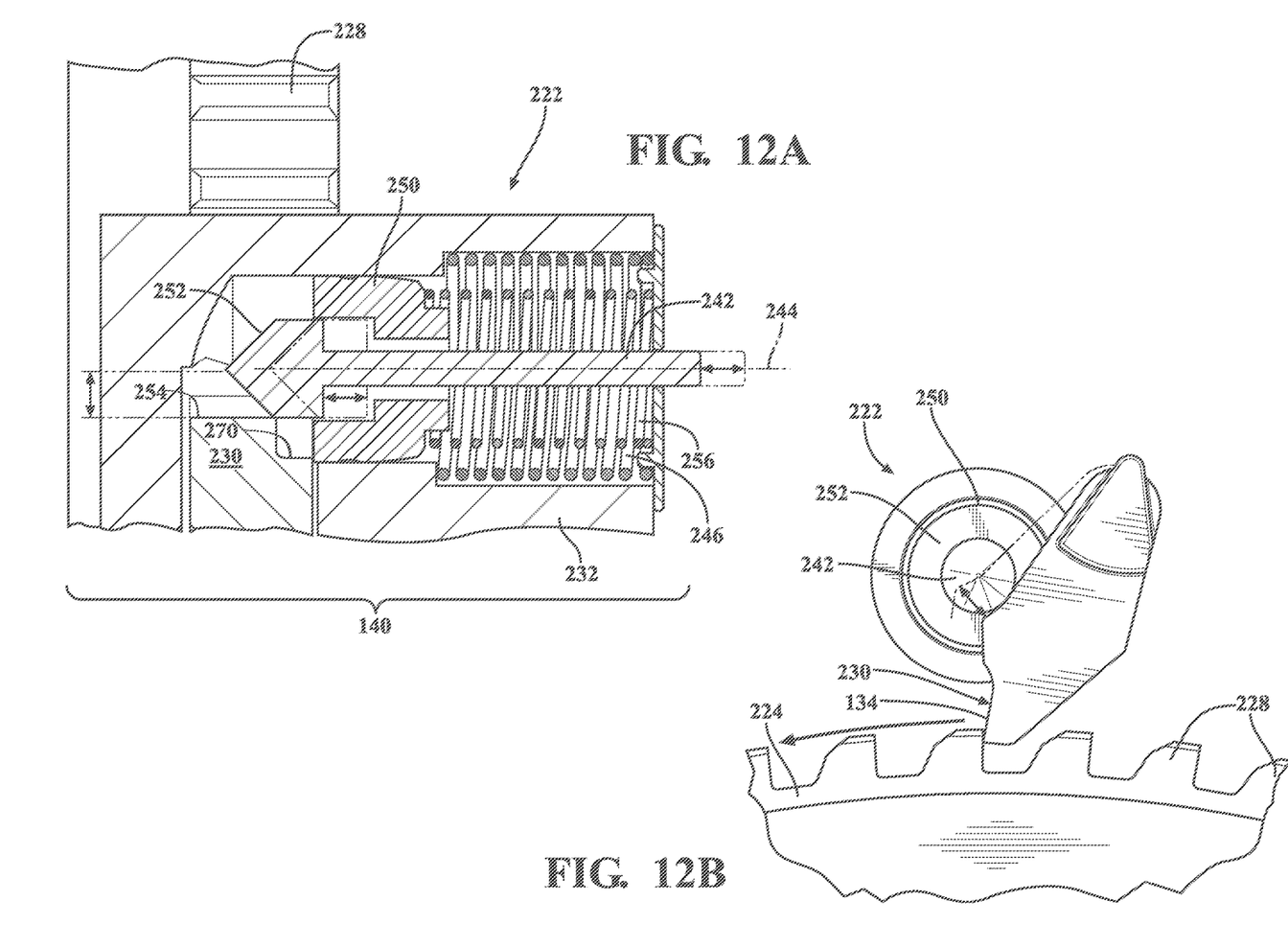
FIG. 12A is a lateral cross-sectional view of the clutch and the portion of the powertrain of FIG. 11A, illustrating the pawl being disposed in the transition state.
FIG. 12B is a longitudinal cross-sectional view of the clutch and the portion of the powertrain of FIG. 12A.
Figures 13A, 13B:
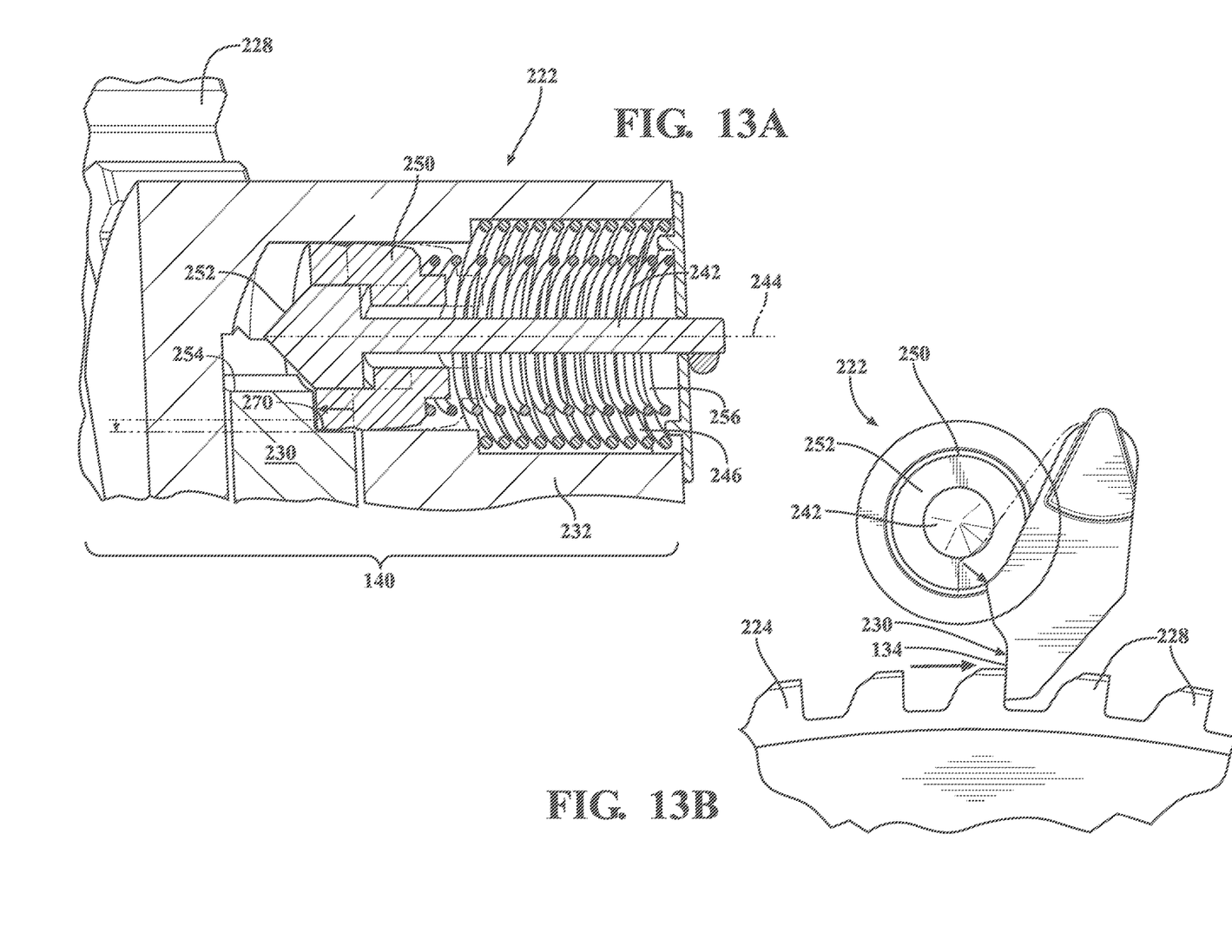
FIG. 13A is a lateral cross-sectional view of the clutch and the portion of the powertrain of FIG. 11A, illustrating the pawl being disposed in the locked state.
FIG. 13B is a longitudinal cross-sectional view of the clutch and the portion of the powertrain of FIG. 13A.

With reference to FIGS. 5-7, the clutch 22 further includes a single pawl 30 at least partially disposed in a housing 32. The housing 32 has a first stop surface 34 and a second stop surface 36. The pawl 30 is movable to a disengaged position (FIG. 5) where the pawl 30 abuts the first stop surface 34 and the pawl 30 is spaced from the ratchet teeth 28 to permit the gear 24 to rotate in any of the forward direction and the reverse direction. In addition, the pawl 30 is also movable to a locked position (FIG. 7) where the pawl 30 abuts the second stop surface 36 and the pawl 30 engages the ratchet teeth 28 to prevent rotation of the gear 24 in the forward direction and the reverse direction. The pawl 30 is also movable to a transition state (FIG. 6) where the pawl 30 permits the gear 24 to rotate in the forward direction and where the initial rotation of the gear 24 in the reverse direction moves the pawl to the locked position. A portion of the pawl 30 that is at or above the center of mass of the pawl 30 is pivotally coupled to the housing 32 to reduce unintended movement of the pawl in response to inertial loads on the pawl during vehicle maneuvering.

The clutch includes one or more springs 38 for moving the pawl 30 to the disengaged position. The springs 38 are helical springs tuned to provide a reactive force that must be overcome to move the pawl 30 to the locked position. In other embodiments, the springs may be one or more torsional springs, leaf springs, or other suitable biasing members.

The clutch 22 further includes a single actuator 40 configured to hold the pawl 30 in the transition state (FIG. 6) when the gear 24 rotates in the forward direction and the locked position (FIG. 7) when the gear 24 initially changes rotation from the forward direction to the reverse direction. The actuator 40 includes a single carrier 42 configured to translate along a longitudinal axis 44 relative to the housing 32, with the carrier 42 being movable between a retracted position (FIG. 5) and an extended position (FIGS. 6 and 7). In this embodiment, the carrier 42 is a rod that translates along a longitudinal axis that is disposed inline or parallel with a plane in which the gear 24 rotates. However, the carrier can be other suitable elements movable in other directions relative to the housing.

The actuator 40 further includes a first biasing member 46 configured to move the carrier 42 to the retracted position (FIG. 5). While this embodiment of the first biasing member 46 is a helical spring, it is contemplated that the first biasing member can be a torsional spring, a leaf spring, other biasing mechanisms.

The actuator 40 further includes a solenoid 48 configured to move the carrier to the extended position when the solenoid 48 is energized. In other embodiments, the actuator may include other actuation mechanisms for moving the carrier to the extended position.

The actuator 40 further includes a single shuttle element 50 configured to translate relative to the carrier 42. In this embodiment, the shuttle element 50 is configured to move the pawl 30 from the disengaged position (FIG. 5) to the transition state (FIG. 6) when the carrier 42 is moved to the extended position (FIG. 6). The shuttle element 50 defines a ramp surface 52 engaging the pawl 30 to dispose the pawl 30 in the transition state when the carrier 42 is moved to the extended position. The shuttle element 50 is configured to oscillate along the longitudinal axis 44 of the carrier 42 while the gear 24 rotates in the forward direction and the carrier 42 is disposed in the extended position. In this embodiment, the ramp surface 52 is angularly disposed relative to the longitudinal axis of the carrier 42.

The shuttle element 50 is movable from a first position (FIG. 6) to a second position (FIG. 7) where the shuttle element 50 holds the pawl 30 in the locked position when the carrier 42 is disposed in the extended position and the gear 24 initially changes rotation from the forward direction to the reverse direction. Put another way, the gear 24 moves the pawl 30 from the transition state to the locked position, which in turn permits the shuttle element 50 to move to the second position where it holds the pawl in the 30 locked position, when the gear rotates the first few degrees in the reverse direction. In this embodiment, the carrier 42 defines a stop surface 54 with the shuttle element 50 being spaced from the stop surface 54 when the pawl 30 is disposed in the transition state and abutting the stop surface 54 when the pawl 30 is disposed in the locked state. In this embodiment, the stop element is a head or flange formed on the end of the rod.

The actuator 40 further includes a second biasing member 56 configured to urge the shuttle element 50 from the first position (FIG. 6) to the second position (FIG. 7). While this embodiment of the second biasing member is a helical spring, it is contemplated that the second biasing member can be other biasing mechanisms. The pawl 30 in the transition state blocks the shuttle element 50 from moving from the first position (FIG. 6) to the second position (FIG. 7), and the second biasing member 56 moves the shuttle element 50 to the second position when the pawl 30 is moved to the locked position (FIG. 7).

With reference to FIGS. 8A-10B, another embodiment of a powertrain 110 is similar to the powertrain 10 of FIGS. 5-7 and includes components identified by the same reference numbers increased by 100. However, while the carrier 42 of FIGS. 5-7 is configured to translate along the longitudinal axis 44 disposed inline or parallel with the rotational plane of the gear 24, the carrier 142 of FIGS. 8A-10B is configured to translate along the longitudinal axis 144 disposed perpendicular to the rotational plane of the gear 124.

With reference to FIGS. 11A-13B, another embodiment of a powertrain 210 is similar to the powertrain 10 of FIGS. 5-7 and includes components identified by the same reference numbers increased by 200. While the shuttle element 50 of FIGS. 5-7 is configured to move the pawl 30 from the disengaged position to the transition state when the carrier 42 is moved to the extended position, the carrier 242 of FIGS. 11A-13B is configured to move the pawl 230 from the disengaged position to the transition state when the carrier 242 is moved to the extended position. The carrier 242 defines a ramp surface 252 engaging the pawl 230 to dispose the pawl 230 in the transition state when the carrier is moved to the extended position.

Movement of the carrier 242 between the retracted position and the extended position is coextensive with movement of the shuttle element 250 between a first position (FIGS. 12A and 12B) where the pawl is disposed in the transition state and a second position (FIGS. 13A and 13B) where the shuttle element 250 holds the pawl 230 in the locked position. In this embodiment, the pawl 230 defines a stop surface 254 and a recess 270 formed in the stop surface 254, wherein the recess 270 is configured to receive the shuttle element 250 when the pawl 230 is moved to the locked position to hold the pawl 230 in the locked position.

Figure 14:
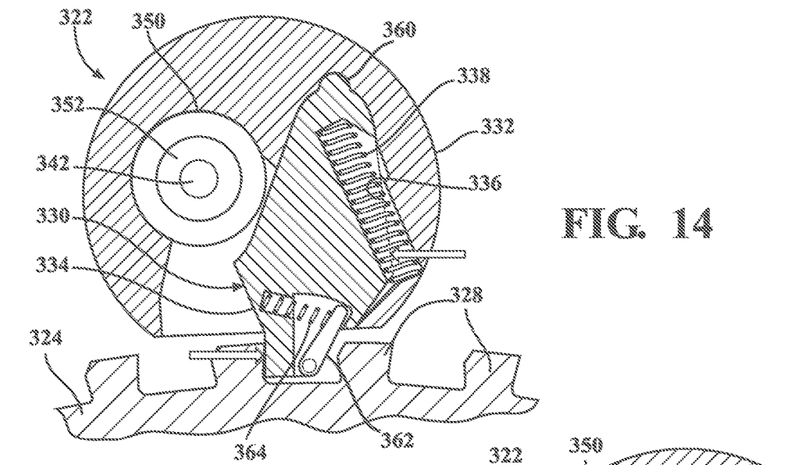
FIG. 14 is an enlarged lateral cross-sectional view of another embodiment of a pawl for a bidirectional overrunning clutch, illustrating the pawl being held in the locked position and including a lever with an arm in a rest position while the flywheel applies a torque to the clutch in the reverse direction.
Figure 15:
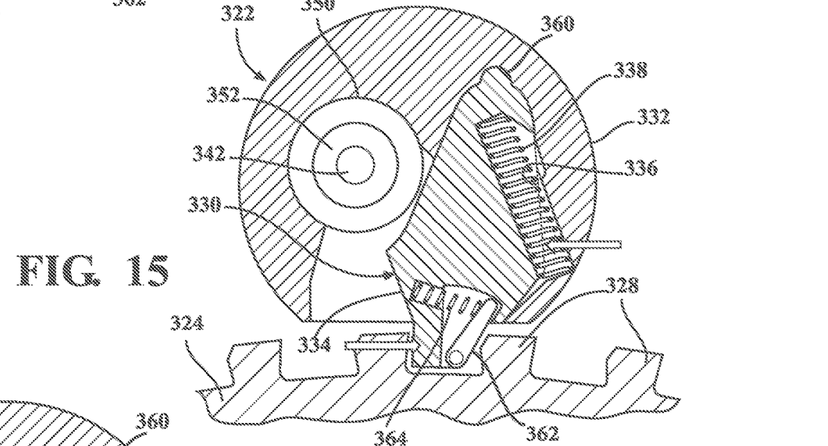
FIG. 15 is an enlarged lateral cross-sectional view of the powertrain of FIG. 14, illustrating the flywheel applying a torque to the clutch in the forward direction with the associated load being below a predetermined threshold.
Figure 16:
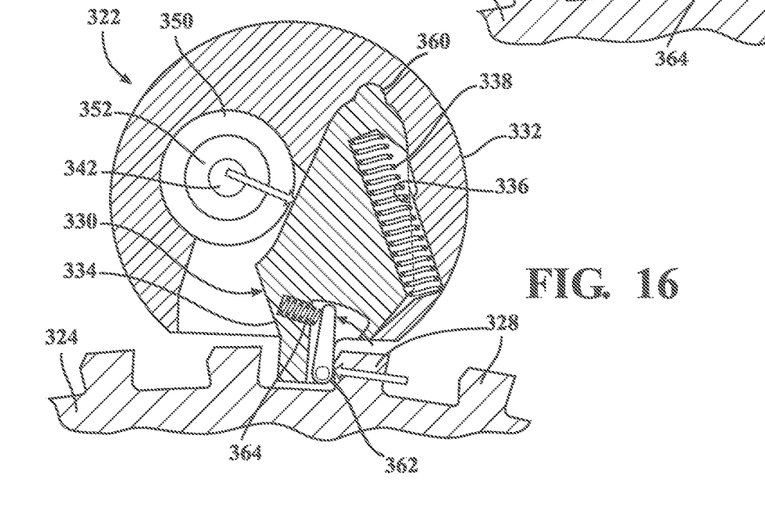
FIG. 16 is an enlarged lateral cross-sectional view of the powertrain of FIG. 14, illustrating the flywheel applying a torque to the clutch in the forward direction with the associated load being above a predetermined threshold.

Referring to FIGS. 14-16, another embodiment of a clutch 322 having a pawl 330 is similar to the clutch 22 of FIGS. 5-7 and includes the same components identified by the same reference numbers increased by 300. However, while the pawl 30 of FIGS. 5-7 is a single body, the pawl 330 of FIGS. 14-16 includes a lever 360 pivotally coupled to the housing 332 and an arm 362 configured to transmit a load from the gear 324 to the lever 360 when the gear 324 rotates in the forward direction (FIG. 14). The arm 362 is movable between a rest position (FIG. 15) where the gear applies a load to the arm that is below a predetermined load threshold and a collapsed position (FIG. 16) where the gear applies a load to the arm that is at or above the predetermined load threshold. The pawl includes a spring 364 for urging the arm 362 to the rest position. The arm disposed in the collapsed position extends along a radial line intersecting a center of the gear 324 such that the arm 362 receives only a tangential component 366 of the load when the gear applies a load to the arm that is at or above the predetermined load threshold.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A bidirectional overrunning clutch for a powertrain of a motor vehicle, the powertrain having a gear defining a plurality of ratchet teeth, the bidirectional overrunning clutch comprising:
    a housing;
    a single pawl movable relative to the housing to a disengaged position where the pawl permits the gear to rotate in any of a forward direction and a reverse direction, a locked position where the pawl engages the ratchet teeth to prevent rotation of the gear in the forward direction and the reverse direction, and a transition state where the gear is capable of rotating in the forward direction such that the plurality of the ratchet teeth of the gear are capable of passing the pawl and where rotation of the gear in the reverse direction moves the pawl to the locked position;
    a spring for moving the pawl to the disengaged position; and
    a single actuator configured to hold the pawl in the transition state when the gear rotates in the forward direction and the locked position when the gear changes rotation from the forward direction to the reverse direction.

2. The bidirectional overrunning clutch of claim 1 wherein the actuator comprises:
    a carrier configured to translate along a longitudinal axis relative to the housing, wherein the carrier is movable between a retracted position and an extended position; and
    a shuttle element configured to translate relative to the carrier, wherein the shuttle element is movable between a first position and a second position;
    wherein at least one of the carrier and the shuttle element is configured to move the pawl from the disengaged position to the transition state when the carrier is moved to the extended position and the gear rotates in the forward direction; and
    wherein the shuttle element is configured to move to the second position where the shuttle element holds the pawl in the locked position when the carrier is disposed in the extended position and the gear changes rotation from the forward direction to the reverse direction.

3. The bidirectional overrunning clutch of claim 2 wherein the actuator further comprises a solenoid configured to move the carrier to the extended position.

4. The bidirectional overrunning clutch of claim 3 wherein the actuator further comprises a first biasing member configured to move the carrier to the retracted position.

5. The bidirectional overrunning clutch of claim 4 wherein the actuator further comprises a second biasing member configured to urge the shuttle element from the first position to the second position.

6. The bidirectional overrunning clutch of claim 5 wherein the pawl in the transition state blocks the shuttle element from moving toward the second position, and wherein the second biasing member moves the shuttle element to the second position when the pawl is moved to the locked position.

7. The bidirectional overrunning clutch of claim 5 wherein the carrier defines a stop surface, wherein the shuttle element is spaced from the stop surface when the pawl is disposed in the transition state, and wherein the shuttle element abuts the stop surface when the pawl is disposed in the locked position.

8. The bidirectional overrunning clutch of claim 5 wherein the shuttle element defines a ramp surface engaging the pawl to dispose the pawl in the transition state when the carrier is moved to the extended position.

9. The bidirectional overrunning clutch of claim 8 wherein the shuttle element is configured to oscillate along the longitudinal axis of the carrier while the gear rotates in the forward direction and the carrier is disposed in the extended position.

10. The bidirectional overrunning clutch of claim 8 wherein the ramp surface is angularly disposed relative to the longitudinal axis of the carrier.

11. The bidirectional overrunning clutch of claim 5 wherein the carrier defines a ramp surface engaging the pawl to dispose the pawl in the transition state when the carrier is moved to the extended position.

12. The bidirectional overrunning clutch of claim 11 wherein the pawl defines a stop surface and a recess formed in the stop surface, wherein the recess is configured to receive the shuttle element when the pawl is moved to the locked position to hold the pawl in the locked position.

13. The bidirectional overrunning clutch of claim 11 wherein movement of the carrier between the retracted position and the extended position is coextensive with movement of the shuttle element between a first position where the pawl is disposed in the transition state and a second position where the shuttle element holds the pawl in the locked position.

14. A powertrain for a motor vehicle, the powertrain comprising:
   a geartrain comprising a gear configured to rotate about a rotational axis in any one of a forward direction and a reverse direction, wherein the gear defines a plurality of ratchet teeth; and
   a bidirectional overrunning clutch comprising:
      a housing;
      a single pawl movable relative to the housing to a disengaged position where the pawl is spaced from the ratchet teeth to permit the gear to rotate in any of a forward direction and a reverse direction, a locked position where the pawl engages the ratchet teeth to prevent rotation of the gear in the forward direction and the reverse direction, and a transition state where the gear is capable of rotating in the forward direction such that the plurality of the ratchet teeth of the gear are capable of passing the pawl and where rotation of the gear in the reverse direction moves the pawl to the locked position;
      a spring for moving the pawl to the disengaged position; and
      a single actuator configured to hold the pawl in the transition state when the gear rotates in the forward direction and the locked position when the gear changes rotation from the forward direction to the reverse direction.

15. The powertrain of claim 14 wherein the actuator comprises:
   a single carrier configured to translate along a longitudinal axis relative to the housing, wherein the carrier is movable between a retracted position and an extended position; and
   a single shuttle element configured to translate relative to the carrier;
   wherein at least one of the carrier and the shuttle element is configured to move the pawl from the disengaged position to the transition state when the carrier is moved to the extended position; and
   wherein the shuttle element is movable from a first position to a second position where the shuttle element holds the pawl in the locked position when the carrier is disposed in the extended position and the gear changes rotation from the forward direction to the reverse direction.

16. The bidirectional overrunning clutch of claim 15 wherein the actuator further comprises a solenoid configured to move the carrier to the extended position.

17. The powertrain of claim 16 wherein the carrier is configured to translate along the longitudinal axis wherein the longitudinal axis is disposed parallel to the rotational axis of the gear.

18. The powertrain of claim 16 wherein the carrier is configured to translate along the longitudinal axis wherein the longitudinal axis is disposed perpendicular to the rotational axis of the gear.

19. The powertrain of claim 16 wherein the pawl comprises:
   a lever pivotally coupled to the housing;
   an arm configured to transmit a load from the gear to the lever when the gear rotates in the forward direction, and the arm is movable between a rest position and a collapsed position; and
   a spring urges the arm to the rest position;
   wherein the arm disposed in the collapsed position extends along a radial line intersecting a center of the gear such that the arm receives only a tangential component of the load.

20. A powertrain of a hybrid electric motor vehicle, the powertrain comprising:
   an internal combustion engine;
   a first electric motor;
   a second electric motor;
   an output;
   a geartrain configured to transmit torque between the internal combustion engine, the first electric motor, the second electric motor, and the output, and the powertrain includes a flywheel configured to rotate about a rotational axis in any one of a forward direction and a reverse direction, wherein the flywheel defines a plurality of ratchet teeth; and
   a bidirectional overrunning clutch comprising:
      a housing;

a single pawl movable to a disengaged position where the pawl is spaced from the ratchet teeth to permit the gear to rotate in any of a forward direction and a reverse direction, a locked position where the pawl engages the ratchet teeth to prevent rotation of the gear in the forward direction and the reverse direction, and a transition state where the gear is capable of rotating in the forward direction such that the plurality of the ratchet teeth of the gear are capable of passing the pawl and where rotation of the gear in the reverse direction moves the pawl to the locked position;

a spring for moving the pawl to the disengaged position; and a single actuator configured to hold the pawl in the transition state when the gear rotates in the forward direction and the locked position when the gear changes rotation from the forward direction to the reverse direction, wherein the actuator comprises:

a single carrier configured to translate along a longitudinal axis relative to the housing, wherein the carrier is movable between a retracted position and an extended position; and a single shuttle element configured to translate relative to the carrier;

wherein at least one of the carrier and the shuttle element is configured to move the pawl from the disengaged position to the transition state when the carrier is moved to the extended position; and wherein the shuttle element is movable from a first position to a second position where the shuttle element holds the pawl in the locked position when the carrier is disposed in the extended position and the gear changes rotation from the forward direction to the reverse direction.

* * * * *